US009190687B2

(12) United States Patent
Arcella et al.

(10) Patent No.: US 9,190,687 B2
(45) Date of Patent: Nov. 17, 2015

(54) ASSEMBLIES FOR ELECTROCHEMICAL DEVICES

(75) Inventors: Vincenzo Arcella, Milan (IT); Luca Merlo, Montorfano (IT); Alessandro Ghielmi, Milan (IT)

(73) Assignee: SOLVAY SOLEXIS S.P.A., Milan (IT)

( * ) Notice: Subject to any disclaimer, the term of this patent is extended or adjusted under 35 U.S.C. 154(b) by 1877 days.

(21) Appl. No.: 12/306,883

(22) PCT Filed: Jun. 25, 2007

(86) PCT No.: PCT/EP2007/056318
§ 371 (c)(1),
(2), (4) Date: Dec. 29, 2008

(87) PCT Pub. No.: WO2008/000718
PCT Pub. Date: Jan. 3, 2008

(65) Prior Publication Data
US 2009/0258273 A1    Oct. 15, 2009

(30) Foreign Application Priority Data

Jun. 29, 2006   (IT) .................................. MI06A1261

(51) Int. Cl.
*H01M 4/86*    (2006.01)
*H01M 8/10*    (2006.01)
(Continued)

(52) U.S. Cl.
CPC .......... *H01M 8/1004* (2013.01); *H01M 4/8605* (2013.01); *H01M 4/90* (2013.01); *H01M 4/921* (2013.01); *H01M 4/926* (2013.01); *H01M 8/0234* (2013.01); *H01M 8/0239* (2013.01); *H01M 8/0243* (2013.01);
(Continued)

(58) Field of Classification Search
None
See application file for complete search history.

(56) References Cited

U.S. PATENT DOCUMENTS

2004/0201122 A1*  10/2004  O'Brien ........................ 264/104
2005/0014056 A1    1/2005  Zuber et al.
2005/0075406 A1*   4/2005  Miyake et al. ................. 521/27

FOREIGN PATENT DOCUMENTS

EP    1 369 948 A1    12/2003
EP    1 702 669 A      9/2006
(Continued)

OTHER PUBLICATIONS

Litster S et al; "PEM Fuel Cell Electrodes", Journal of Power Sources, May 3, 2004, pp. 61-76, vol. 130, No. 1-2, Elsevier, Amsterdam, NL.

*Primary Examiner* — Patrick Ryan
*Assistant Examiner* — Wyatt McConnell
(74) *Attorney, Agent, or Firm* — Arent Fox LLP

(57) ABSTRACT

MEA 7-layer assemblies with gasket, comprising:
  a film of ionomeric membrane (3), containing functional acid groups —SO$_3$H and/or —COOH, having in at least one direction, called direction x, a size variation lower than 0.08%;
  two GDL sheets (1) and (2) in porous material having on one surface an electrocatalytic layer, not shown in the Figures, of which:
    the first sheet DGL (1) is coextensive with the membrane (3) surface, positioned so as to overlap thereto;
    the second sheet GDL (2), having a lower width but the same length of the film of membrane (3), measured in the x direction;
    the two sheets (1) and (2) placed so that the electrocatalytic layer comes into contact, respectively, with each of the two membrane faces;
  a gasket positioned according to a frame shape along the assembly perimeter.

25 Claims, 4 Drawing Sheets

(51) Int. Cl.
*H01M 4/90* (2006.01)
*H01M 4/92* (2006.01)
*H01M 8/02* (2006.01)

(52) U.S. Cl.
CPC ......... *H01M 8/0271* (2013.01); *H01M 8/0291* (2013.01); *H01M 8/1023* (2013.01); *H01M 8/1025* (2013.01); *H01M 8/1039* (2013.01); *H01M 8/1067* (2013.01); *H01M 8/1093* (2013.01); *Y02E 60/521* (2013.01)

(56) References Cited

FOREIGN PATENT DOCUMENTS

| WO | WO 99/04446 A | 1/1999 |
| WO | WO 2004/114451 A | 12/2004 |
| WO | WO 2006/002878 A | 1/2006 |

\* cited by examiner

ASSEMBLIES FOR ELECTROCHEMICAL DEVICES

CROSS-REFERENCE TO RELATED APPLICATION

This application is a National Stage entry of International Application No. PCT/EP2007/056318, filed Jun. 25, 2007, the entire specification claims and drawings of which are incorporated herewith by reference.

The present invention relates to 7-layer MEA (Membrane Electrode Assembly or membrane-electrode assemblies or simply 7-layer assemblies), also called 7-layer MEA, having a gasket placed along the external perimeter of the assembly, according to a frame shape, having a high gas seal and the 7-layer assembly being obtainable also with a continuous process. The membrane-electrode assemblies are used in electrochemical devices, in particular in PEM (proton exchange membranes) fuel cells.

The present invention refers also to the preparation of the electrode-membrane assemblies by a continuous process.

It is known in the prior art that in the fuel cell, the MEA is placed among the bipolar plates of the reaction cell. The membrane-electrode assembly in the simplest embodiment is formed of an ionomeric membrane, acting as an electrolyte, having an electrocatalytic layer (catalyzed area) applied on both sides. This assembly is called Catalyst Coated Membrane (CCM) or 3-layer MEA.

It is also known that in the fuel cells 7-layer MEAs are used obtained by applying on each of the two surfaces of a 3-layer MEA, in sequence, the following layers:

a gas microdiffusion layer having hydrophobic characteristics generally formed of a mixture of carbon powder and PTFE;

a gas macrodiffusion layer, having hydrophobic characteristics, generally formed of carbon fibers or carbon tissues treated with PTFE.

Generally the gas microdiffusion layer is already joined to the gas macrodiffusion layer to form a composite called GDL (gas diffusion layer), or gas dif-fusor.

The single reaction cells (MEA+bipolar plates) are assembled in electrical series thus obtaining a device called fuel cell stack.

As known the PEM fuel cells comprise a MEA, i.e. a core wherein there is an ionomeric membrane having on each side an electrode layer containing the catalyst for the combustion reaction, on each of the two electrode layers there is at least one gas diffusion layer (GDL), generally two, the MEA is in contact with the bipolar plates.

In each bipolar plate, facing the 7-layer MEA, there is at least one channel wherein the comburent is fed, generally air or pure oxygen and another channel for the fuel, for example pure hydrogen, or gaseous mixtures containing hydrogen, or methanol or ethanol aqueous solutions.

In the PEM fuel cell a gasket is generally used interposed between the MEA and the two bipolar plates so that during the assembling of the MEA between the bipolar plates an insulating zone both from the electrical point of view and for the gas sealing is formed. The gasket indeed prevents the mixing of the reacting gases, thus avoiding an explosion risk and a cell performance decrease. Besides, the gasket also assures the sealing of optional cooling fluids used to cool the PEM fuel cell.

The 7-layer MEA assemblies are known in the prior art and are obtainable through the following processes: See for examples J. of Power Sources, "PEM Fuel Cell Electrodes" 130 (2004) pages 61-76.

One process applies by hot pressing on both sides of an ionomeric membrane one gas diffusion layer in contact with the membrane, the diffusion layer being formed of a GDL having an electrocatalytic layer.

Another process prepares a CCM by applying an electrocatalytic layer on both sides of an ionomeric membrane, and then applying by hot pressing a GDL on each of the CCM sides.

7-layer MEA with integral gasket are industrially produced and known in the prior art.

Patent application WO 99/04,446 describes 7-layer MEA assemblies with elastomeric gaskets obtained by a continuous process. The membrane, the electrocatalytic layers and the GDL of the 7-layer MEA are co-extensive and thus they have the same perimeter. The continuous process comprises a step wherein from a 7-layer MEA having suitable sizes, assemblies, having the sizes required for the final use, are cut out. The obtained MEAs are placed in a mold and by injection molding a gasket is applied along the MEA frame or MEA external perimeter. In this step the gasket must be applied so to penetrate for some millimeters into the porous structure of each of the two GDLs and furthermore adhere to the ionomeric membrane along the cut perimeter. The disadvantage of this 7-layer MEA of this patent application is to have a low duration in the hydration/dehydration cycles during the fuel cell functioning. Tests carried out by the Applicant by using a press for preparing the 7-layer MEA with gasket have shown that after 75 cycles, a decay of the PEM fuel cell performances takes place.

In patent application US 2005/0014056 a 7-layer MEA with gasket is described wherein the two GDL have different surfaces. The first GDL has surface size lower than that of the ionomeric membrane, the second GDL is coextensive with the membrane. The GDL having lower size is centered on the membrane so that a frame, of at least 1 mm, of membrane is not covered by said GDL. The drawback of this assembly is that it is not obtainable by a continuous process, since the GDL having surface sizes lower than the membrane must be positioned so as to result centered with respect to the membrane. This represents a remarkable drawback from the industrial point of view, since it lowers the productivity. As a matter of fact, the process of this patent application results not continuous.

In patent application WO 2004/114,451 a 7-layer MEA with gaskets is described wherein the membrane edges extend beyond the edges of at least one of the two GDL. This assembly has the same drawback of the ones described in patent application US 2005/0014056: the MEA is not obtainable in a continuous way.

The need was felt to have available 7-layer MEA assemblies with gaskets, having the following combination of properties:

improved duration in the PEM fuel cell, even after repeated hydration/dehydration cycles typical of the electrochemical devices, even more than 200 cycles, by using the test described below;

their obtainment also with a continuous process and thus with high productivity.

The Applicant has unexpectedly and surprisingly found 7-layer MEA assemblies with gasket solving the above mentioned technical problem.

An object of the present invention are 7-layer MEA assemblies with gasket, comprising (see FIGS. 2 and 3):

an ionomeric membrane film (3) having in direction x, a size variation lower than 8%, determined by the following expression:

$$(A-B) \times 100/B$$

wherein:
B is the membrane length in the x direction, after drying under vacuum for a time of 1 h at 105° C. and at a residual pressure lower than 30 mBar;
A is the membrane length in the x direction after treatment in distilled water at 100° C. for 30 minutes;
two GDL sheets (1) and (2) in porous material having on one surface an electrocatalytic layer, not shown in the Figs., wherein:
one (1), which comprises also (5), see below, coextensive with the membrane surface (3);
the second (2) having length equal to that of the film of membrane (3), measured in the x direction, and a lower width, whereby two strips of membrane (3) parallel to the x direction remain uncovered;
the two sheets (1) and (2) placed so that the electrocatalytic layer contacts, respectively, each of the two membrane surfaces;
a gasket (4) placed according to a frame shape along the assembly perimeter so to cover the two uncovered strips of membrane (3) parallel to the x direction.

Preferably the gasket (4) is applied so to penetrate along the perimeter of the two GDL. Penetrations of about 1 mm (see (5) (6) of FIGS. 2 and 3) are suitable.

For a better understanding of the invention in the Figures from 1 to 6 a preferred embodiment of the invention is represented.

FIG. 1 shows a top view of a 7-layer MEA with gasket according to the present invention from the part having the second sheet GDL (2). (4) is the gasket, (10) is the gasket portion which covers the membrane parts not covered by the second sheet GDL (2).

Figure 1:
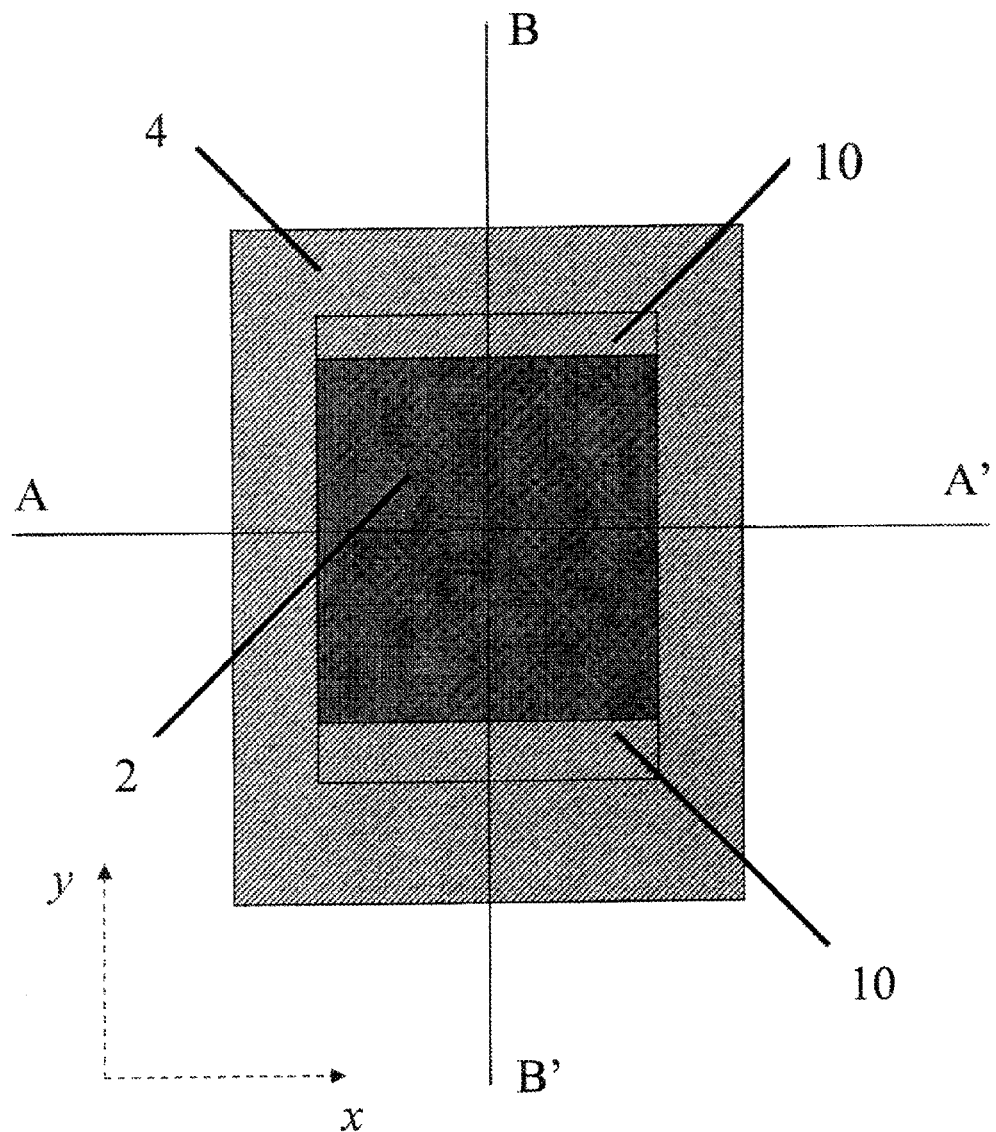
FIG. 1 is a top view of a 7-layer MEA with gasket of the invention.
Figure 2:
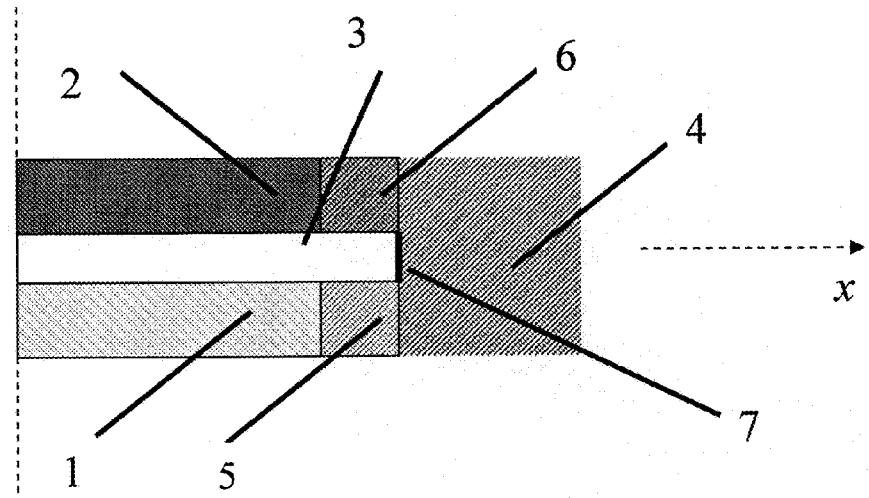
FIG. 2 is the AA' section of the 7-layer MEA with gasket of FIG. 1.

FIG. 2 is a section of the 7-layer MEA with gasket according to the present invention, corresponding to the section AA' of FIG. 1, AA' being a section along the symmetry axis of the assembly parallel to the direction x of the membrane film (3). (2) and (4) have the same meaning as in FIG. 1. (5) is the part of the first sheet GDL (1) impregnated with the gasket (4); (6) is the part of the second sheet GDL (2) impregnated with the gasket (4); (7) is the contact zone between the membrane (3) and the gasket (4), corresponding to the membrane thickness.

Figure 3:
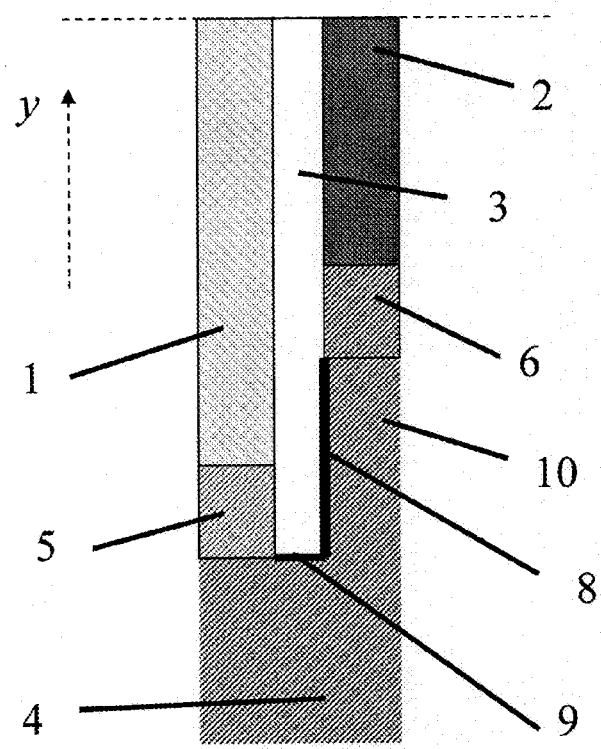
FIG. 3 is the BB' section of the 7-layer MEA with gasket of FIG. 1.

FIG. 3 is a section of the 7-layer MEA with gasket corresponding to the section BB' of FIG. 1. BB' is a section along the symmetry axis of the assembly perpendicular to the x direction of the membrane film (3). (1), (2), (3), (4), (5), (6) have the same meaning of FIGS. 2. (8) and (9) indicate the parts of gasket (4) in contact with the membrane (3). (10) has the same meaning of FIG. 1. FIG. 3 shows that, in the direction perpendicular to the x direction, the membrane (3) is in contact with the gasket (4) in the part indicated with (9), corresponding to the membrane thickness, and in the part indicated with (8), corresponding to the part of the membrane (3) surface not covered by the second GDL (2). (6) indicates the part of the second sheet GDL (2) impregnated with the gasket (4). (5) indicates the part of the first sheet GDL (1) impregnated with the gasket (4).

The ionomeric membrane (3) generally contains as functional groups acid groups —$SO_3H$ and/or —COOH.

The ionomeric membrane films (3) usable in the 7-layer MEA of the present invention are for example membrane films, preferably obtainable by extrusion through the following steps:
extrusion of the membrane containing the precursors of the acid functional groups —$SO_3H$ and/or —COOH, i.e. the —$SO_2F$ groups and/or —COOH precursors such as $COOCH_3$, the extrusion direction being coincident with the x direction of the membrane (3);
hydrolysis of the acid precursors.

The membrane extrusion step generally is carried out at temperatures between 230° C. and 300° C.

The stretching ratio in the extrusion step is generally higher than 10:1, up to 100:1 included, for obtaining membranes having a thickness not lower than 5 µm. By stretching ratio it is meant the ratio between the section of the output of the melted film from the extruder and the final section of the cooled film.

The hydrolysis of the precursors of the acid functional groups of the membrane (3) comprises two steps: the first is carried out in basic conditions and the second in acid conditions, obtaining the ionomers with functional groups in the acid form, —$SO_3H$ and/or —COOH. For example, in case of sulphonyl —$SO_2F$ precursor groups, they are transformed into sulphonic groups —$SO_3H$ by the following steps:
salification of the —$SO_2F$ form into the —$SO_3^-Me^+$ form, wherein Me is an alkaline metal;
acidification of the —$SO_3^-Me^+$ form into the —$SO_3H$ form.

The activation can for example be carried out by dipping the ionomeric membrane in an alkaline aqueous solution, for example containing 10% by weight of KOH, at a temperature between 60° C. and 80° C., for a time over 2 hours, until disappearance of the —$SO_2F$ groups (determined by IR analysis) and formation of the —$SO_3^-Me^+$ group. At the end of the salification step the ionomeric membrane is washed with water at a temperature between 20° C. and 80° C. The acidification step is carried out, for example, by dipping the ionomeric membrane in salified form in an acid aqueous solution, for example, containing 20% by weight of $HNO_3$, at room temperature for a time between 0.5 and 2 hours. At the end a washing is carried out by dipping in water, at a temperature in the range 20° C.-80° C.

The GDL (1) and (2) sheets are generally formed of the following layers:
a gas microdiffusion layer, having hydrophobic characteristics, generally formed of a mixture of carbon powder and PTFE;
a gas macrodiffusion layer, with hydrophobic characteristics, generally formed of carbon fibers or carbon tissues treated with PTFE.

Figure 4:
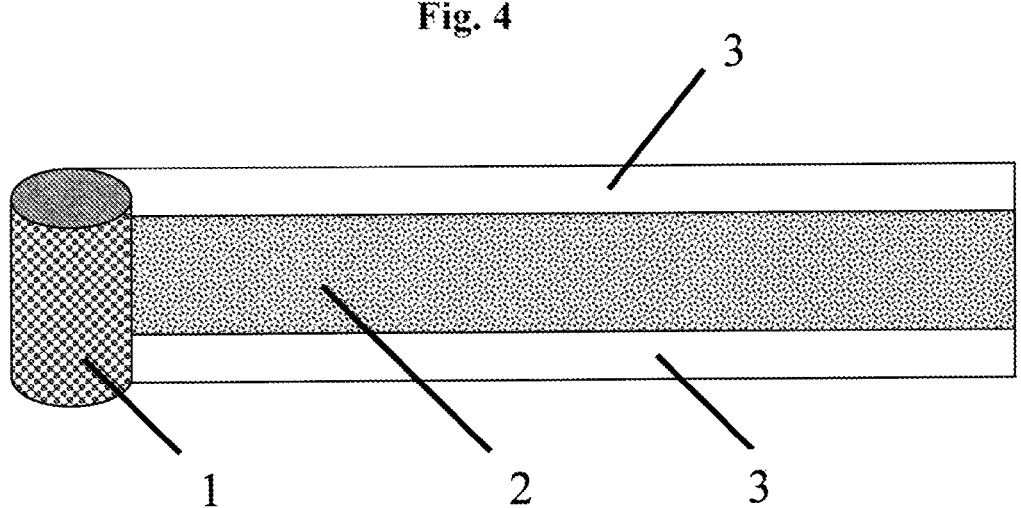
FIG. 4 shows the invention 7-layer MEA roll for obtaining in a continuous way the 7-layer MEA with gasket after cutting.

Generally the width of each uncovered strip of membrane (3) of FIG. 4) on the side bearing the second GDL (2) sheet is between 0.5 mm and 10 mm, preferably between 1 mm and 5 mm.

The electrocatalytic layer is applied on the side of each GDL wherein there is the microdiffusion layer. A spray process of an hydroalcoholic dispersion containing the catalyst, described hereinafter, in admixture with the ionomer can be used at this purpose. The obtained GDL is then dried in an oven at 80° C. for 20 minutes.

GDL sheets having on one of the two surfaces an electrocatalytic layer are commercially available. See for example those called ELAT® LT250EW (E-TEK). Preferably, from the side on which the second GDL (2) sheet is applied, the electrocatalytic layer is not coextensive with the membrane and there are two strips of membrane (3) not covered by the electrocatalytic layer adjacent to the membrane film edges, preferably symmetric with respect to the longitudinal symmetry axis x of the membrane film.

The membrane and the electrocatalytic layers of the MEA device according to the present invention are obtainable by using preferably (per)fluorinated ionomers with sulphonic groups in —$SO_3H$ acid form or salified, having equivalent weight from 380 g/eq to 1,600 g/eq, preferably from 500 to 1.200 g/eq, still more preferably 750-950 g/eq. The preferred ionomers comprise the following units:

(A) monomeric units deriving from one or more fluorinated monomers containing at least one ethylene unsaturation;
(B) fluorinated monomeric units containing —$SO_2F$ sulphonyl groups in such amount that the ionomer has the equivalent weight in the above mentioned range.

Alternatively homopolymers formed of monomeric units (B) can be used as ionomers.

The ionomers containing sulphonic groups in acid form —$SO_3H$ can be obtained by hydrolysis of the —$SO_2F$ groups, and optionally salification of the —$SO_3H$ groups, as described above in step 1b).

The (A) fluorinated monomers are selected from the following:
vinilydene fluoride (VDF);
$C_2$-$C_8$ perfluoroolefins, preferably tetrafluoroethylene (TFE);
$C_2$-$C_8$ chloro- and/or bromo- and/or iodo-fluoroolefins such as chlorotrifluo-roethylene (CTFE) and bromotrifluoroethylene;
$CF_2$=$CFOR_{f1}$ (per)fluoroalckylvinylethers (PAVE), wherein $R_{f1}$ is a $C_1$-$C_6$ (per)fluoroalkyl, for example trifluoromethyl, bromodifluoromethyl, pentafluoropropyl;
$CF_2$=CFOX perfluoro-oxyalkylvinylethers, wherein X is a $C_1$-$C_{12}$ perfluorooxyalkyl having one or more ether groups, for example perfluoro-2-propoxy-propyl;
fluorovinylethers (MOVE) of general formula $CFX_{AI}$=$CX_{AI}OCF_2OR_{AI}$, wherein $R_{AI}$ is a linear, branched $C_1$-$C_6$ (per)fluoroalkyl group or $C_5$-$C_6$ cyclic, or a linear or branched when possible $C_1$-$C_6$ (per)fluorooxyalkyl group containing from one to three oxygen atoms; when $R_{AI}$ is fluoroalkyl or fluorooxyalkyl as defined above it can contain from 1 to 2 atoms, equal or different, selected from the following: H, Cl, Br, I; $X_{AI}$=F, H, preferably F; the preferred fluorovinylethers are:
(MOVE 1) $CF_2$=$CFOCF_2OCF_2CF_3$, (MOVE 2) $CF_2$=$CFOCF_2OCF_2CF_2OCF_3$, (MOVE 3) $CF_2$=$CFOCF_2OCF_3$.

The (B) fluorinated monomers are selected from one or more of the following:
$F_2C$=CF—O—$CF_2$—$CF_2$—$SO_2F$;
$F_2C$=CF—O—[$CF_2$—$CX_AF$—O]$_{nA}$—($CF_2$)$_{nB}$—$SO_2F$ wherein $X_A$=Cl, F or $CF_3$; nA=1-10, nB=2, 3;
$F_2C$=CF—O—($CF_2$)$_{nC}$—$SO_2F$; nC=3-10;
$F_2C$=CF—Ar—$SO_2F$ wherein Ar is an aromatic ring, the ring can be substituted in one or more free positions by aliphatic chains from 1 to 10 carbon atoms, optionally containing heteroatoms.

Other fluorinated monomers (B'), which can be used alternatively to (B) for preparing the ionomers, are those having equivalent weight as reported for sulphonic monomers; the monomers (B') containing precursor groups which are transformed by hydrolysis into —COOH acid groups, optionally with their subsequent salification. These monomers can be optionally used in admixture with those containing —$SO_2F$ groups (monomers (B)).

Fluorinated monomers (B') used for preparing the ionomers containing —COOH acid groups have the following structures:
$F_2C$=CF—O—$CF_2$—$CF_2$—Y;
$F_2C$=CF—O—[$CF_2$—$CX_AF$—O]$_{nA}$—($CF_2$)$_{nS}$—Y wherein $X_A$=Cl, F or $CF_3$; nA=1-10, nB=2, 3;
$F_2C$=CF—O—($CF_2$)$_{nC}$—Y; nC=3-10;
$F_2C$=CF—Ar—Y wherein Ar is an aryl group;
wherein Y is a precursor group of the carboxylic group, selected from the following: CN, COF, COOH, $COOR_B$, $COO^-Me^+$, $CONR_{2B}R_{3B}$, wherein $R_B$ is $C_1$-$C_{10}$, preferably $C_1$-$C_3$ alkyl and $R_{2B}$ and $R_{3B}$, equal or different, are H or have the $R_B$ meaning, Me is an alkaline metal.

As said, the fluorinated monomers (B') having the above described formulas can be in admixture with the fluorinated monomers containing —$SO_2F$ sulphonyl groups, the total amount of the monomers (B) and (B') being such that the ionomer equivalent weight is in the above indicated range.

Optionally the invention fluorinated ionomers can contain from 0.01% to 2% by moles of monomeric units deriving from a bis-olefin of formula:

$$R_1R_2C=CH-(CF_2)_m-CH=CR_5R_6 \qquad (I)$$

wherein:
m=2-10, preferably 4-8;
$R_1$, $R_2$, $R_5$, $R_6$, equal to or different from each other, are H or $C_1$-$C_5$ alkyl groups, preferably H.

Preferably the membranes and the electrocatalytic layers of the present invention device contain perfluorinated ionomers obtainable from ionomers comprising:
monomeric units deriving from TFE;
monomeric units deriving from $CF_2$=CF—O—$CF_2CF_2SO_2F$.

The membranes generally have a thickness ranging from 5 micrometers to 200 micrometers, preferably from 10 to 80 micrometers, more preferably from 15 to 60 micrometers. The electrocatalytic layers generally have a thickness ranging from 3 micrometers to 50 micrometers, preferably from 5 to 30 micrometers.

The electrocatalytic layers comprise one ionomer and a catalyst. The latter is preferably Pt or a mixture of Pt with one or more metals, as for example Ru, Rh, Mo. The catalyst is finely dispersed and preferably supported on carbon powder. The powders known with the following commercial names: Vulcan XC-72, Ketjen Black, Black Pearls, Shawinigan Acetylene Black, etc. can for example be used. The ionomer used in an electrocatalytic layer has a composition and/or equivalent weight equal to or different from the ionomer used in the membrane and/or in the other electrocatalytic layer. The ratio by weight between catalyst and ionomer generally ranges from 0.5 to 4, preferably between 0.5 and 2.5. The ratio by weight between the catalyst metal and the support in powder is preferably higher than or equal to 10%. When as fuel hydrogen is used, said ratio is comprised between 20% and 60%, when methanol is used, the ratio is between 60% and 100%.

The ratio mg of catalyst metal/$cm^2$ of electrocatalytic layer generally ranges from 0.01 to 2. When in the cell hydrogen is used as fuel, the ratio (mg of catalyst metal)/($cm^2$ of electrocatalytic layer) preferably ranges from 0.01 to 0.7 mg/$cm^2$, preferably using at the cathode side a ratio ranging from 0.1 to 0.7 mg/$cm^2$. When methanol is used as fuel, said ratio preferably ranges from 0.3 to 1 mg/$cm^2$ at the anode side and from 0.5 to 2 mg/$cm^2$ at the cathode side.

As gaskets, polymers selected from silicones, fluorosilicones, fluoroelastomers, EPDM (rubbers), thermoplastic elastomers (for example styrene-butadiene bock copolymers) are used.

As said, in the 7-layer MEA assemblies with gasket of the invention, the contact between the membrane (3) and the gasket (4) (see FIGS. 2 and 3) takes place in the following zones:
- along the whole perimeter of the membrane (3), for a thickness equal to that of the membrane;
- on that assembly surface on which the second sheet GDL (2) was applied, in correspondence of the membrane strips not covered by the GDL (2) (see FIG. 4).

It has been surprisingly and unexpectedly found that the 7-layer MEA with gaskets according to the present invention have a long duration in the fuel cells, since they substantially maintain unaltered (±2% with respect to the value determined before the beginning of the test) the voltage of the open circuit, even after numerous hydration and dehydration cycles, determined according to the test reported hereinafter.

The 7-layer MEA with gasket is assembled in a test device Fuel Cell Technologies® and is subjected to continuous dehydration and hydration cycles characterized as follows:

A) dehydration:
- gas fed to the anode circuit: hydrogen hydrated with dew point 30° C.;
- gas fed to the cathode circuit: air hydrated with dew point 30° C.;
- cell temperature: 80° C.;
- reacting gas pressure: 1.5 bar (hydrogen side), 1.3 bar (air side);
- drained current with electronic load: 20 ampere, corresponding to 800 mA/cm$^2$;
- duration: 60 minutes;

B) hydration:
- gas fed to the anode circuit: hydrogen hydrated with dew point 85° C.;
- gas fed to the cathode circuit: air hydrated with dew point 85° C.;
- cell temperature: 80° C.;
- reacting gas pressure: 1.5 bar (hydrogen side), 1.3 bar (air side);
- drained current with electronic load: 20 ampere, corresponding to 800 mA/cm$^2$;
- duration: 60 minutes.

The dehydration/hydration cycles are repeated up to 200 times. At the beginning of the test and after every 25 cycle repetitions the integrity of the adhesion between membrane/gasket is checked through the measurement of the voltage at open circuit, i.e. with drained current equal to zero, after the hydration cycle.

Figure 5:
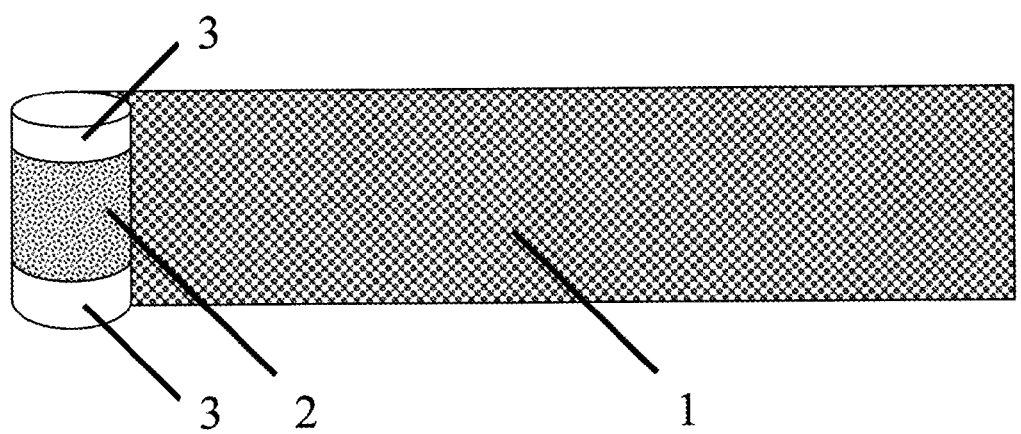
FIG. 5 shows the FIG. 4 roll seen from the opposite side.
Figure 6:
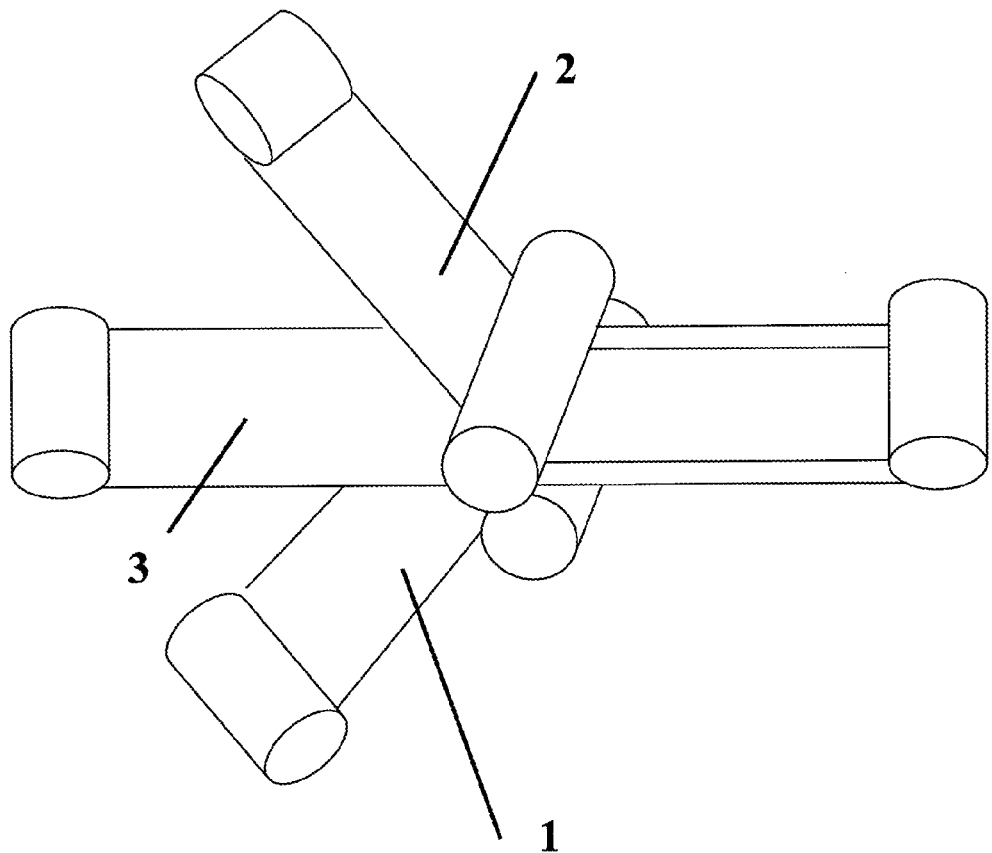
FIG. 6 shows a continuous process for obtaining the roll of FIGS. 4 and 5.

A further object of the present invention is a process for producing 7-layer MEA assemblies with gasket, comprising the following steps (see FIGS. 4-6):

1) obtainment of a roll of a 7-layer MEA assembly, see FIG. 6, by assembling of
   a film of membrane (3) having in the assembling direction, corresponding to the x direction, a size variation lower than 8%, determined as above described, with
   two GDL sheets, (1) and (2), each having on one surface an electrocatalytic layer (not shown in FIG. 6), wherein:
      one of the two GDL sheets, first sheet GDL (1), having the same sizes as length and width as the film of the membrane (3);
      the second sheet GDL (2), having width lower than that of the membrane (3) film, but with the same length in the x direction;
   wherein the two sheets GDL (1) and (2) are placed so that the electrocatalytic layer contacts, respectively, each of the two surfaces of the membrane;
      the first sheet GDL (1) is coextensive with one surface of the membrane (3), see FIG. 5;
      the second sheet GDL (2) placed on the other surface of the membrane (3), so that the GDL edges parallel to the assembling direction (x axis) are internal with respect to the membrane (3) edges, leaving uncovered two strips of the membrane (3), see FIG. 4;
2) the roll obtained in 1) is cut perpendicularly to the assembling direction in the requested formats;
3) application of one gasket to the formats obtained in 2).

The assembling of step 1) can be carried out for example by calendering or hot lamination between two rolls, or by hot molding of the films (1) and (2) on the film (3), etc. The hot calendering between two rolls is preferred.

During the application of the second sheet GDL (2) on one surface of the membrane (3) the two uncovered strips of membrane (3) can have a different width.

Preferably the width is the same.

More specifically FIG. 4 shows a 7-layer MEA roll, obtained in step 1), from the side bearing sheet GDL (2) which leaves uncovered the two membrane strips (3), represented symmetric with respect to the symmetry axis x. (1), (2) and (3) have the meanings indicated before.

FIG. 5 shows a MEA 7-layer roll, obtained in step 1), from the side bearing the first sheet GDL (1).

FIG. 6 shows the application of the first sheet GDL (1) and of the second sheet GDL (2) on the two surfaces of the membrane (3) film.

In step 1) the assembling process is preferably carried out at temperatures in the range 110° C.-200° C., more preferably 120° C.-180° C. The assembling speed is generally comprised between 0.1 and 50 meters/minute, preferably from 0.1 to 20 meters/minute. The pressure exerted by the lamination rolls on the assembly is generally comprised between 5 and 40 Kg/cm$^2$.

Alternatively and preferably, step 1) can be carried out in two steps, in the first the GDL (1) is applied to the membrane (3) and in the second step the GDL (2) is applied on the free membrane surface.

The gasket application in step 3) can be carried out by press molding of the gasket on the format, preferably the gasket is applied by injection molding. This step is preferably carried out at temperatures in the range 130° C.-220° C. and at pressures generally comprised between 100 and 250 bar and for a time between 60 and 600 seconds. During the gasket application it is preferable that the gasket penetrates the GDL sheet, preferably for at least 1 mm. (See (5) and (6) in FIGS. 2 and 3). The Applicant has surprisingly and unexpectedly found that it is essential that there is a direct contact between membrane and gasket, in order to have a good anchorage of the gasket to MEA. See for example (8) of FIG. 3, in the direction y wherein it is possible to have a high membrane dilatation, i.e. in the direction perpendicular to the x direction.

According to another embodiment of the present invention, an electrocatalytic layer is applied to the membrane (3) film on each side, then the GDL sheets (1) and (2) are applied without the electrocatalytic layer. The electrocatalytic layers can be applied on the membrane for example by a continuous decal process, as described in U.S. Pat. No. 6,933,003, by direct casting of the electrocatalytic layer on the membrane or by spraying the catalytic ink on the membrane, as for example described in US 2005/0163920.

As said, it has been unexpectedly and surprisingly found by the Applicant that the assemblies according to the present invention show, during the use in electrochemical devices, for example fuel cells, an improved duration than those of the known assembly of the prior art, even after repeated hydration/dehydration cycles typical of electrochemical devices, longer than 200 cycles, by using the above test (see the Examples).

As said, the process of the present invention allows to obtain a 7-layer MEA assembly from a 7-layer MEA roll also by a continuous process. A gasket is then applied to the 7-layer MEA as described in step 3).

A further object of the present invention is represented by electrochemical devices, in particular fuel cells, comprising the invention assemblies.

The preparation of the ionomers used for preparing the membranes can be carried out with a radical polymerization process in mass, solution, suspension, emulsion. See U.S. Pat. No. 3,282,875, U.S. Pat. No. 6,639,011, U.S. Pat. No. 6,555, 639.

The polymerization in aqueous emulsion or in microemulsion can for example be mentioned. The surfactants which can be used in these polymerizations are (per)fluorinated surfactants, for example salts (as defined below) of the perfluorooctanoic, perfluorononanoic, perfluorodecanoic acid, or their mixtures, etc., (per)fluoropolyethers with an acid end group (example COOH, $SO_3H$), salified with $NH_4^+$ or with alkaline metal cations, the other end group being (per)fluorinated, optionally containing one H or Cl atom. The number average molecular weights of the perfluoropolyether surfactants generally range between 300 and 1,800, preferably between 350 and 750.

The microemulsion polymerization is well known in the art. See U.S. Pat. No. 6,555,639.

In particular the ionomer preparation is carried out by using an aqueous emulsion wherein in the reaction medium, as surfactants, those of formula:

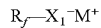

are used, wherein:
$X_1$ is equal to —COO$^-$, —SO$_3^-$;
M is selected from H, $NH_4$ or an alkaline metal;
$R_f$ represents a (per)fluoropolyether chain, preferably having average number molecular weight comprised between about 300 and about 1,800, preferably from 300 to 750, said (per)fluoropolyether chain comprising repeating units selected from one or more of the following:
a) —($C_3F_6O$)—;
b) —($CF_2CF_2O$)—;
c) —($CFL_0O$)—, wherein $L_0$=—F, —$CF_3$;
d) —$CF_2(CF_2)_{z'}CF_2O$—, wherein z' is an integer 1 or 2;
e) —$CH_2CF_2CF_2O$—.

$R_f$ is monofunctional and has a (per)fluorooxyalkyl end group T, for example $CF_3O$—, $C_2F_5O$—, $C_3F_7O$—; optionally in perfluoroalkyl end groups one fluorine atom can be substituted by one chlorine or hydrogen atom. Examples of these end groups are Cl($C_3F_6O$)—, H($C_3F_6O$)—. The unit a) $C_3F_6O$ can be $CF_2$—CF($CF_3$)O— or —CF($CF_3$)$CF_2O^-$.

The polymerization in aqueous emulsion is well known in the prior art. See U.S. Pat. No. 6,639,011.

In the above mentioned formula $R_f$ preferably has one of the following structures:
1) T-($CF_2O$)$_a$—($CF_2CF_2O$)$_b$—$CF_2$—
with b/a comprised between 0.3 and 10, extremes included, a being an integer different from 0;
2) T-($CF_2$—($CF_2$)$_{z'}$—$CF_2O$)$_b$—$CF_2$—
wherein z' is an integer equal to 1 or 2;
3) T-($C_3F_6O$)$_r$—($C_2F_4O$)$_b$—($CFL_0O$)$_t$—$CF_2$—
with r/b=0.5-2.0, b being different from zero; (r+b)/t=10-30;
a, b, b', r, t, are integers, the sum of which is such that $R_f$ has the above mentioned number average molecular weight values; T=—$OCF_3$ or —$OCF_2Cl$.

The compounds wherein $R_f$ has the formula 3) wherein b=0, are still more preferred.

The (per)fluoropolyethers $R_f$ are obtainable with well known processes of the prior art, see for example the following patents herein incorporated by reference: U.S. Pat. No. 3,665,041, U.S. Pat. No. 2,242,218, U.S. Pat. No. 3,715,378 and EP 239,123. The fluoropolyethers functionalized with hydroxyl termination are for example obtained according to the patents EP 148,482, U.S. Pat. No. 3,810,874, from which the functional end groups are obtained with the processes indicated in these patents.

It is possible to use in polymerization chain transfer agents. For example iodide and/or bromides of alkaline or alkaline-earth metals, according to what described in U.S. Pat. No. 5,173,553. Preferably chain transfer agents containing hydrogen, such as hydrocarbons, alcohols, in particular ethyl acetate and ethane are used.

The polymerization initiators used in the present invention process are preferably radical inorganic initiators, such as for example ammonium and/or potassium and/or sodium persulphate, optionally in combination with ferrous, cuprous or silver salts. The method of the initiator feeding in the polymerization reactor can be in a continuous way or with an only addition at the beginning of the polymerization.

The polymerization reaction is generally carried out at temperatures in the range 25° C.-70° C., preferably 50-60° C., under pressure up to 30 bar (3 MPa), preferably higher than 8 bar (0.8 MPa).

Monomer (B) and optionally (B') is fed into the polymerization reactor in a continuous way or by steps.

When the polymerization is completed, the ionomer is isolated by conventional methods, such as coagulation by addition of electrolytes or by freezing.

If desired, the membrane can be crosslinked. When the membranes are obtained by extrusion then the crosslinking is not carried out.

In order to carry out the crosslinking, the crosslinkable ionomer of which the membrane is formed, is mixed with crosslinking agents. The sulphonic fluorinated ionomers are crosslinked for example by peroxidic way. In this case they must contain radical attack sites in the chain and/or in end position to the macromolecules, for example iodine and/or bromine atoms.

Preferably the crosslinkable fluorinated sulphonic ionomers comprise:
monomeric units deriving from TFE;
monomeric units deriving from $CF_2$=CF—O—$CF_2CF_2SO_2F$;
monomeric units deriving from the bis-olefin of formula (I);
iodine atoms in end position.

The introduction in the chain of said iodine and/or bromine atoms can be carried out by addition, in the reaction mixture, of brominated and/or iodinated "cure-site" comonomers, such as bromo- and/or iodo-olefins having from 2 to 10 carbon atoms, as described for example in U.S. Pat. No. 4,035, 565 and U.S. Pat. No. 4,694,045, or iodo- and/or bromofluoro-alkylvinylethers, as described in U.S. Pat. No. 4,745, 165, U.S. Pat. No. 4,564,662 and EP 199,138, in amounts such that the "cure-site" comonomer content in the final product is generally comprised between 0.05 and 2 moles per 100 moles of the other basic monomeric units.

Alternatively, or also in combination with "cure-site" comonomers, the introduction of iodine and/or bromine end atoms can be carried out by addition to the reaction mixture of iodinated and/or brominated chain transfer agents, such as for example the compounds of formula $R_{f1}(I)_{x^o}(Br)_{y^o}$, wherein $R_{f1}$ is a (per)fluoroalkyl or a (per)fluorochloroalkyl having from 1 to 8 carbon atoms, while $x^o$ and $y^o$ are integers comprised between 0 and 2, with $1 \leq x^o + y^o \leq 2$ (see for example U.S. Pat. No. 4,243,770 and U.S. Pat. No. 4,943,622). It is also possible to use as chain transfer agents iodides and/or bromides of alkaline or alkaline-earth metals, according to what described in U.S. Pat. No. 5,173,553.

Preferably crosslinking of radical type uses ionomers containing units of the bis-olefin of formula (I) and iodine in end position.

The sulphonic ionomer is crosslinked by radical way at a temperature in the range 100° C.-200° C., in connection with the type of peroxide used, by adding a peroxide capable to generate radicals by heating. Generally, the peroxide amount is between 0.1% and 5% by weight with respect to the polymer. Among the peroxides which can be used, the following ones can be mentioned: dialkylperoxides, such as for example di-terbutyl-peroxide and 2,5-dimethyl-2,5-di(terbutylperoxy)-hexane; dicumyl peroxide; dibenzoyl peroxide; diterbutyl perbenzoate; di-1,3-dimethyl-3-(terbutylperoxy)butylcarbonate. Other peroxidic systems are described, for example, in the patent applications EP 136,596 and EP 410,351.

Furthermore the following components can optionally be added to the ionomer mixture with the crosslinking agents:

a crosslinking co-agent, in amount comprised between 0.5 and 10%, preferably between 1 and 7% by weight with respect to the polymer; among crosslinking co-agents it can be mentioned: triallyl-cyanurate; triallyl-isocyanurate (TAIC); tris(diallylamine)-s-triazine; triallylphosphite; N,N-diallyl-acrylamide; N,N,N',N'-tetraallyl-malonamide; trivinyl-isocyanurate; 2,4,6-trivinilmethyltrisiloxane; N,N'bisallyibicyclo-oct-7-ene-disuccinimide (BOSA); bis olefin of formula (I), triazines;

a metal compound, in amounts comprised between 1% and 15%, preferably between 2% and 10% by weight with respect to the polymer, said metal compound selected from divalent metal oxides or hydroxides, such as for example Mg, Zn, Ca or Pb, optionally associated to a weak acid salt, such as for example stearates, benzoates, carbonates, oxalates or phosphites of Ba, Na, K, Pb, Ca;

conventional additives such as thickeners, pigments, antioxidants, stabilizers and the like;

inorganic or polymeric reinforcing fillers, preferably optionally fibrillatable PTFE. Preferably the fillers have particle size from 10 to 100 nm, preferably 10-60 nm.

Generally the films of ionomeric membranes (3) obtained by extrusion have a size variation in the extrusion direction x of the order of 4-8% depending on the stretching ratio. Size variations of the order of 4-5% are generally reached.

The following Examples illustrate with non limitative purposes the present invention.

EXAMPLES

Methods

Determination of the Membrane Size Variations in the x Direction

The size variation in the x direction is determined according to the following formula:

$$(A-B) \times 100/B$$

wherein:
B is the length of the membrane film (i.e. a plane film) in the considered direction, after drying under vacuum for a time of 1 h at 105° C. and at a residual pressure lower than 30 mBar;
A is the membrane length in the considered direction after treatment in distilled water at 100° C. for 30 minutes.

Test of Duration in Fuel Cell of 7-Layer MEA with Gasket

The 7-layer MEA with gasket is assembled in a test device Fuel Cell Technologies® and is subjected to continuous hydration and dehydration cycles characterized as follows:
A) dehydration:
gas fed to the anode circuit: hydrogen hydrated with dew point 30° C.;
gas fed to the cathode circuit: air hydrated with dew point 30° C.;
cell temperature: 80° C.;
reacting gas pressure: 1.5 bar (hydrogen side), 1.3 bar (air side);
drained current with electronic load: 20 ampere, corresponding to 800 mA/cm$^2$;
duration: 60 minutes;
B) hydration:
gas fed to the anode circuit: hydrogen hydrated with dew point 85° C.;
gas fed to the cathode circuit: air hydrated with dew point 85° C.;
cell temperature: 80° C.;
reacting gas pressure: 1.5 bar (hydrogen side), 1.3 bar (air side);
drained current with electronic load: 20 ampere, corresponding to 800 mA/cm$^2$;
duration: 60 minutes.

The dehydration/hydration cycle is repeated up to 200 times. At the beginning of the test and after every 25 cycle repetitions the integrity of the adhesion between membrane/gasket is checked through the measurement of the voltage at open circuit, i.e. with drained current equal to zero, after the hydration cycle.

A damaging of the MEA with gasket is indicated by a significant decrease, higher than 2% with respect to the starting value, of the voltage determined at open circuit.

Pull Off Test ISO 4624

The test has been carried out under the following conditions:

| | |
|---|---|
| specimen area: | 615.4 mm$^2$; |
| pull off rate: | 0.5 mm/min; |
| type of adhesive used: | VHB (3M). |

Example A

Polymerization and Obtainment of an Ionomer Having Equivalent Weight 850 g/Eq

In a 22 liter autoclave the following reactants are introduced:

11.5 liters of demineralized water;
980 g of sulphonic monomer having formula:

$CF_2=CF—OCF_2CF_2—SO_3F$;

3,100 g of a solution at 5% by weight in water of the compound having formula:

$CF_2ClO(CF_2CF(CF_3)O)_m(CF_2O)_nCF_2COOK$ having number average molecular weight 521 and a n/M ratio=10.

The liquid inside the autoclave is put under stirring at 540 rpm and heated to a temperature of 60° C. An aqueous solution containing 6 g/liter of potassium persulphate (KPS) is added in amounts of 150 ml and the pressure is brought to 13 bar with gaseous TFE.

When 1,000 g of TFE have been fed into the reactor, 175 g of sulphonic monomer of formula $CF_2=CF—OCF_2—CF_2SO_2F$ are added. Then 175 g of the same sulphonic are added for every 200 g of TFE fed into the autoclave. The TFE addition is carried out so that the pressure inside the autoclave remains constant at the pressure of 13 bar.

The polymerization is stopped after 249 minutes by interrupting the stirring, cooling the autoclave and reducing the pressure by discharging TFE in excess. During the polymerization the overall quantity added of TFE was of 4,000 g.

The obtained latex has a concentration of 28% w/w. The latex is coagulated by freezing and defrosting the polymer collected, washed with water and dried in stove for 40 h at 150° C.

With a specimen of the dried polymer, a film is prepared by a press by bringing the polymer to melt at 270° C. The film is then treated for 8 h with a KOH solution 10% w/w at the temperature of 80° C. and then washed with demineralized water. Then the film is treated with a 20% w/w solution of nitric acid at room temperature and washed again with demineralized water. The film is then dried; weighed and titred with a diluted NaOH solution, obtaining an equivalent weight of the polymer equal to 850 g/eq.

Example B

Preparation of an Ionomeric Membrane by Polymer Extrusion Having Eq. w. 850 g/Eq The dried polymer recovered at the end of the polymerization described in the previous Example is granulated and then fed into a single screw extruder Profile® Dies 45 having the head temperature set up at 265° C.

By maintaining a stretching ratio equal to 12, a membrane having a 40 μm thickness is obtained.

The obtained membrane is then activated by the following steps:
1) saponification in a 10% KOH bath at 80° C. for a time of 4 h;
2) washing in demineralized water at room temperature;
3) acidification in a 20% w/w $HNO_3$ bath in water at room temperature (25° C.);
4) washing in demineralized water at room temperature.

The final thickness of the ionomeric membrane is 50 μm. The size variations, measured according to the above described method, are equal to 7% in the extrusion direction and to 17% in the direction perpendicular to extrusion.

Example 1

Obtainment of a 7-Layer MEA with Gasket According to the Present Invention and Duration Test in Fuel Cell A 7-layer MEA having 5.4×5.4 cm sizes is assembled with the extruded membrane obtained in the Example B and two GDL of the LT250E-W type having a catalytic layer applied on the side which comes into contact with the ionomeric membrane, by means of a hot pressing process carried out under the following conditions:

| | |
|---|---|
| temperature: | 150° C.; |
| pressure: | 15 Kg/cm$^2$; |
| time: | 5 minutes. |

The membrane sizes are 5.4×5.4 cm.
The sizes of the first GDL are 5.4×5.4 cm.
The sizes of the second GDL are 5.2×5.4 cm.

The assembly step is carried out so that the first GDL results coextensive to the membrane, while the second GDL is centered with respect to the symmetry axis of the membrane parallel to the extrusion direction, and the shorter dimension of the GDL is perpendicular to this axis.

A 7-layer MEA is thus obtained which on one of the two surfaces has two membrane stripes left uncovered by the GDL. Said stripes have 0.1×5.4 cm sizes.

As material for the gasket the fluorinated elastomer Tecnoflon® FOR 435 is used.

The 7-layer MEA is inserted in a Terenzio® Presse model molding press by using suitable sealing frames so as to obtain a frame gasket having 7×7 cm external sizes. The penetration of the gasket material in the porous matrix of the 7-layer MEA GDL is 2 mm on each of the 4 perimeter sides. In this way a central surface remains on each of the two faces of the 7-layer MEA, not covered by the gasket material, having 5×5 cm sizes on the side of the first GDL and 4.8×5 cm sizes on the side of the second GDL.

The molding conditions for applying the gasket are the following:

| | |
|---|---|
| temperature: | 170° C.; |
| pressure: | 180 bar; |
| time: | 90 seconds. |

The so obtained 7-layer MEA with gasket is transferred into a test device Fuel Cell Technologies® and subjected to the test conditions hereinabove set forth.

The open circuit voltage value determined at the beginning of the test is of 964 mV. After 200 cycles the voltage is of 968 mV, i.e. it substantially remains unaltered, as it is within the experimental error.

Example 2

Comparative

Obtainment of a 7-Layer MEA with Gasket According to the Prior Art and Duration Test in Fuel Cell A 7-layer MEA having 5.4×5.4 cm sizes is assembled with an extruded membrane obtained in the Example B and two GDL of the LT250E-W type with catalyst applied on the side which comes into contact with the ionomeric membrane, by using a hot pressing process under the following conditions:

| | |
|---|---|
| temperature: | 150° C.; |
| pressure: | 15 Kg/cm$^2$; |
| time: | 5 minutes. |

The membrane sizes are 5.4×5.4 cm.
The sizes of the first GDL are 5.4×5.4 cm.

The sizes of the second GDL are 5.4×5.4 cm.

The assembly step is carried out so that both the GDLs result coextensive to the membrane.

As material for the gasket the fluorinated elastomer Tecnoflon® FOR 435 is used.

The 7-layer MEA is inserted in a Terenzio® Presse model molding press with suitable sealing frames so as to obtain a frame gasket having 7×7 cm external sizes. The penetration of the gasket material in the porous matrix of the 7-layer MEA GDL is 2 mm on each of the 4 perimeter sides. In this way a central surface remains on each of the two faces of the 7-layer MEA, not covered by the gasket material, having 5×5 cm sizes.

The molding conditions for applying the gasket are the following:

| | |
|---|---|
| temperature: | 170° C.; |
| pressure: | 180 bar; |
| time: | 90 seconds. |

The so obtained 7-layer MEA with gasket is transferred into a test device Fuel Cell Technologies® and subjected to the test conditions hereinabove set forth.

The open circuit voltage value determined at the beginning of the test is of 966 mv; after 75 cycles the voltage value is 840 mV. This indicates that the 7-layer MEA with gasket gas been damaged under the test conditions. Therefore the test has been interrupted.

Example 3

Comparative

Determination of the Adhesion of the Fluoroelastomer Tecnoflon FOR 435 Used as Gasket Material to Extruded Membranes Hyflon® Ion and to the GDL Used in the 7-Layer MEA, Respectively Two specimens having 5×5 cm sizes were cut out from the membrane obtained in Example B.

(I) The first membrane specimen has been inserted in a Terenzio® Presse model molding press by using suitable sealing frames, so as to leave free for the molding step two surfaces in central position of the membrane, having each 4×4 sizes, aligned each other and placed respectively on the upper and lower surface of the membrane. On the two surfaces 4×4 cm a film having a 0.5 mm thickness formed of Tecnoflon FOR 435 was molded, by using the same conditions described in the previous Examples.

(II) The second membrane specimen was used to achieve, by hot pressing, a 7-layer MEA assembly by using two GDL LT250E-W (E-TEK) with catalyst applied on one side, having 5×5 cm sizes. The catalyzed side of each GDL is turned towards the membrane. The hot pressing conditions are the following:

| | |
|---|---|
| temperature: | 150° C.; |
| pressure: | 15 Kg/cm$^2$; |
| time: | 5 minutes. |

The obtained assembly is inserted in a Terenzio® Presse model molding press by using suitable sealing frames, so as to leave free for the molding step two central surfaces of 4×4 cm aligned each other, placed respectively on the upper and lower face of the 7-layer MEA. On the two surfaces 4×4 cm a film having a 0.5 mm thickness formed of Tecnoflon FOR 435 was molded, under the same conditions described above. In this case the gasket material impregnates the GDL and is not in contact, as it is instead for the hereinabove previous case (I), with the membrane.

From the two so obtained specimens a circular portion was cut out having an area of 615.4 mm$^2$ by means of a suitable hollow punch so that the cut portion was formed, in sequence, by the following layers:

in the first case (I) (membrane without GDL) by gasket, membrane, gasket;

in the second case (II) (membrane with GDL), in the order, by gasket, GDL impregnated by gasket, membrane, GDL impregnated by gasket, gasket.

Both these specimens have been submitted to a pull off test ISO 4624, in order to determine the adhesion force between the membrane and the elastomeric material of the gasket.

In the first case (I) the detachment between membrane and gasket took place by applying a force of 14 MPa. In the second case (II) the applied force was of 1.3 MPa.

This shows that the adhesion between membrane and gasket is higher in the case when the contact between membrane and gasket takes place directly with respect to the case wherein a porous GDL layer results instead interposed between the membrane and the gasket.

The invention claimed is:

1. A 7-layer membrane electrode assembly with gasket, comprising:

a film of ionomeric membrane having in the direction x, a size variation lower than 8%, determined by the following expression:

$$(A-B) \times 100/B$$

wherein:
B is the membrane length in the x direction, after drying under vacuum for a time of 1 h at 105° C. and at a residual pressure lower than 30 mBar;
A is the membrane length in the x direction after treatment in distilled water at 100° C. for 30 minutes;

first and second gas diffusion layers in porous material each having on one surface an electrocatalytic layer, of which:
said first gas diffusion layer is coextensive with the ionomeric membrane surface;
said second gas diffusion layer has a gas diffusion layer length equal to that of the film of ionomeric membrane, measured in the x direction, and a shorter width than the film of ionomeric membrane, leaving uncovered two strips of the film of ionomeric membrane parallel to the x direction;
said first and second gas diffusion layers are placed so that the electrocatalytic layer contacts, respectively, each of the two membrane surfaces, a gasket placed according to a frame shape along the assembly perimeter, so as to penetrate along the perimeter of said first and second gas diffusion layers for at least 1 mm, and which covers the two uncovered strips of film of ionomeric membrane parallel to the x direction.

2. An assembly according to claim 1, wherein the film of ionomeric membrane contains acid functional groups —SO$_3$H and/or —COOH.

3. An assembly according to claim 1, wherein the ionomeric membrane film is obtainable by the following steps:

md extrusion of the membrane containing the precursors of the acid functional groups —SO3H and/or —COON, the extrusion direction being coincident with the x direction of the film of ionomeric membrane;

hydrolysis of the precursors of the acid functional groups of the membrane.

4. An assembly according to claim 3, wherein the extrusion step is carried out at temperatures between 230° C. and 300° C.

5. An assembly according to claim 3, wherein the stretching ratio in the extrusion step is higher than 10:1, up to and including 100:1.

6. An assembly according to claim 1, wherein said first and second gas diffusion layers are formed of the following layers:
   a gas microdiffusion layer having hydrophobic characteristics;
   a gas macrodiffusion layer with hydrophobic characteristics.

7. An assembly according to claim 1, wherein the width of each strip of membrane on the side bearing said second gas diffusion layer is between 0.5 mm and 10 mm.

8. An assembly according to claim 1, wherein the membrane and the electrocatalytic layers are obtainable by using (per)fluorinated ionomers with sulphonic groups in —$SO_3H$ acid form or salified, having equivalent weight from 380 g/eq to 1,600 g/eq.

9. An assembly according to claim 8, wherein the (per) fluorinated ionomers comprise the following units:
   monomeric units deriving from one or more fluorinated monomers containing at least one ethylene unsaturation; and
   fluorinated monomeric units containing —$SO_2F$ sulphonyl groups in such amount that the ionomer has the equivalent weight in the above mentioned range.

10. An assembly according to claim 8, wherein the membranes and the electrocatalytic layers contain perfluorinated ionomers obtainable from ionomers comprising:
    monomeric units derived from tetrafluoroethylene (TFE);
    monomeric units derived from $CF_2$=CF—O—$CF_2CF_2SO_2F$.

11. An assembly according to claim 1, wherein the electrocatalytic layers comprise one ionomer and a catalyst, said catalyst being finely dispersed and supported on carbon powder.

12. An assembly according to claim 11, wherein the ratio by weight between catalyst and ionomer in each of the two electrocatalytic layers ranges from 0.5 to 4.

13. An assembly according to claim 11, wherein the ratio, mg of catalyst metal/$cm^2$ of electrocatalytic layers ranges from 0.01 to 2.

14. An assembly according to claim 1, wherein the gasket is formed of polymers selected from the group consisting of silicones, fluorosilicones, fluoroelastomers, ethylene propylene diene monomer (EPDM), and thermoplastic elastomers.

15. An assembly according to claim 1, wherein the contact between the membrane and the gasket takes place in the following zones:
    along the perimeter of the film of ionomeric membrane, for a thickness equal to that of the membrane;
    on that assembly surface on which the second gas diffusion layer was applied, in correspondence with the membrane strips not covered by said second gas diffusion layer.

16. A process for producing 7-layer membrane electrode assemblies with gasket according to claim 1, comprising the following steps:
    1) obtainment of a roll of a 7-layer membrane electrode assembly by assembling of
       a film of ionomeric membrane having in the assembling direction, corresponding to the x direction, a size variation lower than 8%, determined by the following expression:

$(A-B) \times 100/B$ wherein:
       B is the membrane length in the x direction, after drying under vacuum for a time of 1 h at 105° C. and at a residual pressure lower than 30 mBar;
       A is the membrane length in the x direction after treatment in distilled water at 100° C. for 30 minutes; with
       first and second gas diffusion layers, each having on one surface an electrocatalytic layer, wherein:
         the first gas diffusion layer, has the same length and width as the film of the ionomeric membrane;
         the second gas diffusion layer, having a width lower than that of the film of ionomeric membrane film, but with the same length in the x direction;
       wherein said first and second gas diffusion layers are placed so that the electrocatalytic layer contacts, respectively, each of the two surfaces of the membrane;
         the first gas diffusion layer coextensive with one surface of the film of ionomeric membrane,
         the second gas diffusion layer placed on the other surface of the film of ionomeric membrane, the gas diffusion layer edges being parallel to the assembling direction or x axis, are internal with respect to the film of ionomeric membrane edges, leaving uncovered two strips of the film of ionomeric membrane,
    2) the roll obtained in 1) is cut perpendicularly to the assembling direction in the requested formats;
    3) application of one gasket to the formats obtained in 2).

17. A process according to claim 16, wherein the assembling in step 1) is carried out by calendering or hot lamination between two rolls, or by hot molding the first and second gas diffusion layers on the film of ionomeric membrane.

18. A process according to claim 17, wherein calendering is used.

19. A process according to claim 16, wherein in step 1) the assembling is carried out at temperatures in the range 110° C.; the assembling speed being comprised between 0.1 and 50 meters/minute; and the pressure exerted by the lamination rolls on the assembly being comprised between 5 and 40 Kg/$cm^2$.

20. A process according to claim 16, wherein the step 1) is carried out in two steps, wherein in the first step, the first gas diffusion layer is applied to the film of ionomeric membrane, and in the second step, the second gas diffusion layer is applied on the free membrane surface.

21. A process according to claim 16, wherein the gasket application in step 3) can be carried out by injection molding.

22. A process according to claim 21, wherein the gasket application is carried out at temperatures in the range 1300C-2201C and at pressures comprised between 100 and 250 bar and for a time between 60 and 600 seconds.

23. A process according to claim 16, wherein an electrocatalytic layer is applied on each side of the ionomeric membrane films(s) and said first and second gas diffusion layers are successively applied in contact with each electrocatalytic layer.

24. Electrochemical devices comprising the assemblies according to claim 1.

25. A method of using the assembly according to claim 1, comprising:
    placing said assembly in an electrochemical device.

* * * * *